United States Patent
Saikia et al.

(10) Patent No.: US 11,703,608 B2
(45) Date of Patent: Jul. 18, 2023

(54) RESERVOIR CHARACTERIZATION USING MACHINE-LEARNING TECHNIQUES

(71) Applicant: Landmark Graphics Corporation, Houston, TX (US)

(72) Inventors: Kalyan Saikia, Richmond, TX (US); Samiran Roy, Kolkata (IN)

(73) Assignee: Landmark Graphics Corporation, Houston, TX (US)

(*) Notice: Subject to any disclaimer, the term of this patent is extended or adjusted under 35 U.S.C. 154(b) by 162 days.

(21) Appl. No.: 17/136,838

(22) Filed: Dec. 29, 2020

(65) Prior Publication Data

US 2022/0206177 A1 Jun. 30, 2022

(51) Int. Cl.
*G01V 1/30* (2006.01)
*G06N 5/04* (2023.01)
*G06N 20/00* (2019.01)

(52) U.S. Cl.
CPC .............. *G01V 1/307* (2013.01); *G06N 5/04* (2013.01); *G06N 20/00* (2019.01); *G01V 2210/63* (2013.01)

(58) Field of Classification Search
CPC ........... G01V 1/307; G06N 5/04; G06N 20/00
See application file for complete search history.

(56) References Cited

U.S. PATENT DOCUMENTS

| 6,560,540 | B2 | 5/2003 | West et al. | |
|---|---|---|---|---|
| 2010/0138196 | A1* | 6/2010 | Hui | E21B 43/00 703/1 |
| 2013/0218817 | A1 | 8/2013 | Vashist et al. | |
| 2015/0241881 | A1 | 8/2015 | Ige et al. | |
| 2016/0313463 | A1* | 10/2016 | Wahrmund | G01V 1/30 |
| 2016/0328388 | A1 | 11/2016 | Cao et al. | |
| 2019/0041534 | A1* | 2/2019 | Bandura | G01V 99/005 |

(Continued)

FOREIGN PATENT DOCUMENTS

WO 2017188858 A1 11/2017
WO 2020056073 3/2020

OTHER PUBLICATIONS

Chaki et al., "Well-Log and Seismic Data Integration for Reservoir Characterization: A Signal Processing and Machine-Learning Perspective", Mar. 2018, 3 pages, abstract only.

(Continued)

*Primary Examiner* — Catherine T. Rastovski
(74) *Attorney, Agent, or Firm* — Kilpatrick Townsend & Stockton LLP (57) ABSTRACT

A system can determine a location for future wells using machine-learning techniques. The system can receive seismic data about a subterranean formation and may determine a set of seismic attributes from the seismic data. The system can block the set of seismic attributes into a set of blocked seismic attributes by distributing the set of seismic attributes onto a geo-cellular grid representative of the subterranean formation. The system can apply a trained machine-learning model to the set of blocked seismic attributes to generate a composite seismic parameter. The system can distribute the composite seismic parameter in the subterranean formation to characterize formation locations based on a predicted presence of hydrocarbons.

20 Claims, 7 Drawing Sheets

(56) References Cited

U.S. PATENT DOCUMENTS

2021/0304060 A1\* 9/2021 Al Madani .............. G06N 5/04
2022/0113441 A1\* 4/2022 Griffith ................. G06N 3/084

OTHER PUBLICATIONS

PCT App. No. PCT/US2020/067437, "International Search Report and the Written Opinion", dated Sep. 8, 2021, 10 pages.
Chaki et al., "A Novel Preprocessing Method Based on Variational Mode Decomposition for Reservoir Characterization Using Support Vector Regression", Oct. 2019, 10 pages.
Laudon et al., "Machine Learning Applied to 3D Seismic Data from the Denver-Julesburg Basin Improves Stratigraphic Resoultion in the Niobrara", Unconventional Resources Technology Conference, Jul. 2019, 17 pages.
Sacrey et al., "Systematic Workflow for Reservioir Characterization in Northwestern Colombia Using Multi-Attribute Classification", First Break, vol. 38, Mar. 2020, 6 pages.
Zhao , "Seismic Facies Classification Using Different Deep Convolutional Neural Networks", 2010-2018, 8 pages.

\* cited by examiner

RESERVOIR CHARACTERIZATION USING MACHINE-LEARNING TECHNIQUES

TECHNICAL FIELD

The present disclosure relates generally to wellbore operations and, more particularly (although not necessarily exclusively), to characterizing a subterranean formation using machine-learning techniques.

BACKGROUND

A subterranean formation may include hydrocarbon material, and an exploration operation of the subterranean formation may include objectives such as determining whether to form a hydrocarbon well, where to form the hydrocarbon well, a combination thereof, or other suitable objectives. The exploration operation may model the subterranean formation based on information about the subterranean formation, but the subterranean formation model may be inaccurate or otherwise unreliable due to a limited number of existing wells, or the lack thereof, in the subterranean formation. The inaccurate or otherwise unreliable model may result in an unreliable recommendation relating to whether to form a hydrocarbon well, where to form the hydrocarbon well, and the like.

DETAILED DESCRIPTION

Certain aspects and examples of the present disclosure relate to characterizing a subterranean formation to determine at least one location for a future well in the subterranean formation using a composite seismic parameter generated by machine-learning techniques. The composite seismic parameter may be determined from a combination of seismic attributes that are extracted or otherwise determined from seismic data relating to the subterranean formation. The composite seismic parameter may include information about the subterranean formation, may be used to determine the location of the future well in the subterranean formation, and may be determined by a computing device that uses machine-learning techniques. The machine-learning techniques may include applying trained models to the seismic attributes to fully classify the seismic data relating to the subterranean formation. Using the fully classified seismic data, the techniques may involve identifying future well locations in the subterranean formation. The trained models may include a trained, semi-supervised classification algorithm, a trained, supervised classification algorithm, a combination thereof, or other trained models for determining the composite seismic parameter.

Machine-learning (ML) techniques can be applied to multiple seismic attributes for reservoir characterization and identification of appraisal or development well targets. Hidden characteristics of the reservoir can be identified and may provide insight into sweet-spots included in the reservoir through ML algorithms using 3D seismic data. Sweet-spots may be locations that are considered optimal for drilling a well. In early stages of exploration with limited well data, difficulties can exist for proper integration of seismic information with well information and generating a depth-calibrated 3D sub-surface model. Such challenges and difficulties can be overcome with the described techniques. Using ML-based techniques, the issue of selecting the right seismic attribute, or the right combination of seismic attributes, for a reservoir characterization process can be addressed. In some examples, the described techniques may use all of the identified seismic attributes in the reservoir characterization process. The techniques can help in quantification of uncertainty and reduction of exploration data analysis risk. The techniques may additionally address the issue of limited existing wells or limited available well data for conventional geo-cellular modeling.

The techniques can include using 2D and 3D subsurface seismic data. Quality of the seismic data can be checked in terms of depth migration and noise reduction. Once the quality check (QC) of the seismic data is completed, a variety of seismic attributes, such as acoustic impedance, sweetness, phase, dip, azimuth, and the like, can be calculated for the seismic volume. Interpretation of seismic data can be conducted in terms of faults and horizons to create a 3D sub-surface structural framework. The structural framework can be converted to a 3D geo-cellular grid with reasonable grid dimensions that cover the subterranean formation and the interpreted and identified reservoir. Within the geo-cellular grid, the seismic attributes can be blocked, or upscaled, and then yielded to a point set for multivariate data analytics using ML techniques. Blocking the seismic dataset to the geo-cellular grid can eliminate unwanted seismic measurements above or below the reservoir zone. The geo-cellular grid may be created to resemble the bin size of seismic data, thus, mitigating or eliminating the threat of losing resolution. The blocking process may additionally generate clean data points with properly defined X, Y, and Z, and as such, the blocking process may be suitable for use in ML-based analysis.

In an example, ML models of the ML techniques may be trained using data collected from exploratory wells. For example, favorable zones of the exploratory wells may be identified for the exploratory wells. The favorable zones may correspond to optimal hydrocarbon-producing depth-ranges determined during a formation evaluation test, a petrophysical log interpretation, suitable lithology, production data analysis, etc. The favorable zones can be used to train the ML model and label the seismic attributes to be used in subsequent phases.

The semi-supervised classification-based ML techniques can be deployed to create a composite seismic parameter such as a machine learning predicted composite (MLPC) attribute that represents a combination of the selected seismic attributes. In other words, the composite seismic parameter may be a combined representation of the selected seismic attributes for each location in the subterranean formation. The limited available well data in terms of lithology identification, production test, pressure test, etc. can supervise the modeling process. Through the semi-supervised approach, a domain-based understanding of geology and ML-based relationship can be combined to adopt a hybrid approach to reduce reservoir characterization uncertainty. The 3D distribution model of the MLPC attribute can be generated using geo-statistics-based reservoir characterization techniques accounting for vertical and horizontal inhomogeneity and scaling effects. The 3D distribution model of the MLPC can be used to locate favorable spots in the reservoir for finding future appraisal or development drilling targets.

The described techniques can provide a unique way of using effects of multiple seismic attributes to indicate future well locations during exploration operations of a prospective reservoir using ML and data analytics techniques. The described techniques may leverage simultaneous effects of multiple variables as indicators of possible future drilling sites to provide benefits in terms of reducing risk, project cycle time, and uncertainty. The described techniques may reduce computation time compared to conventional and existing techniques. The 3D reservoir characterization can improve reservoir characterization in environments with limited well data, such as early phase of exploration. Confidence levels in delineation and demarcation of 3D reservoir boundaries and sub-surface analysis can be improved. Using the described techniques may yield a shorter project delivery time and increased accuracy in sweet spot identification for well placement.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
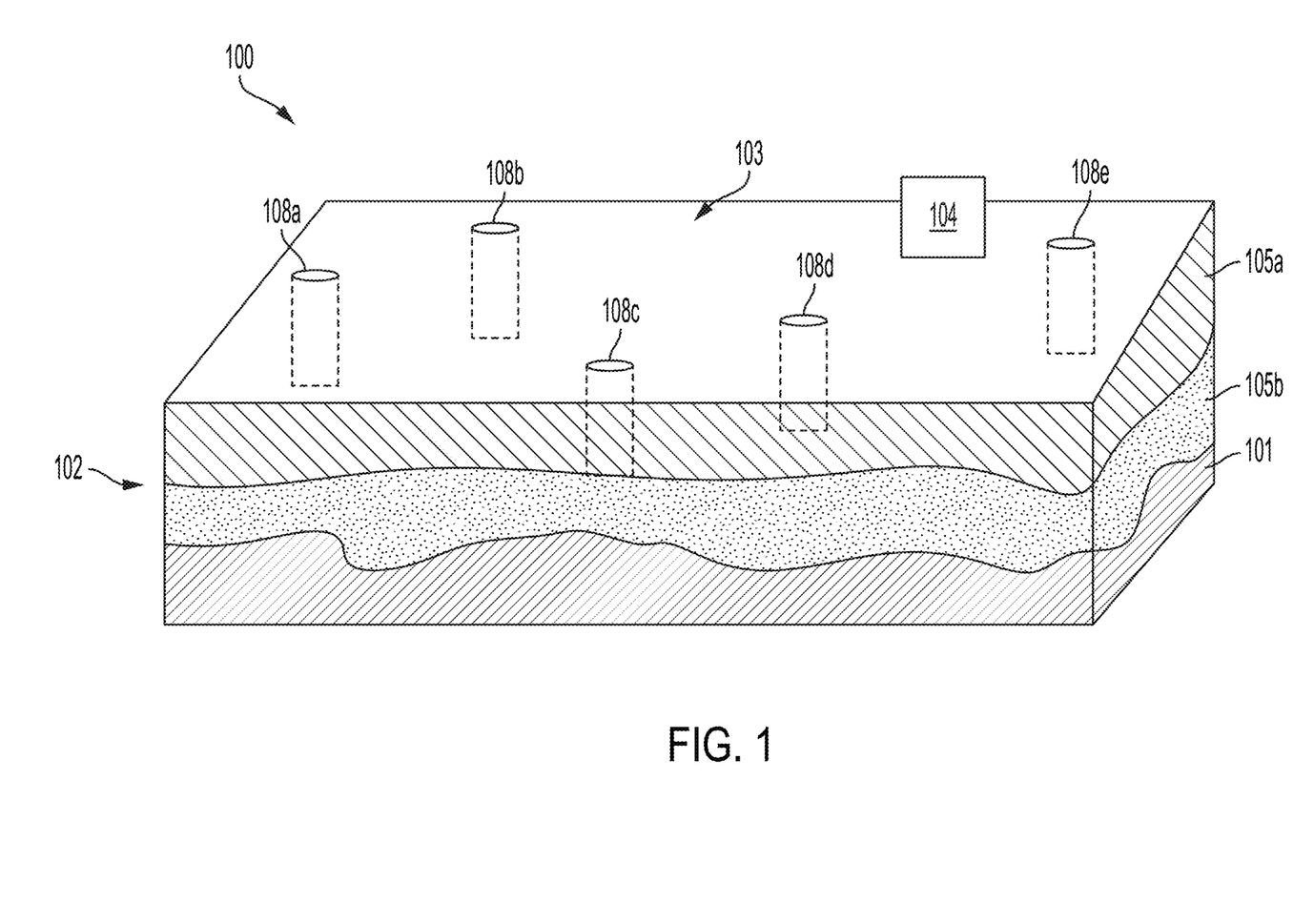
FIG. 1 is a cross-sectional side-view of a subterranean formation with a set of potential future well sites according to one example of the present disclosure.

FIG. 1 is a cross-sectional side-view of a subterranean formation 100 with a set of potential future well sites 108a-e according to one example of the present disclosure. The subterranean formation 100 may include an underground region 102 and a surface region 103. The underground region 102 may be formed of various strata 105a-b that can include different materials (e.g., rock, soil, oil, water, or gas) and vary in thickness and shape. In some examples, the potential future well sites 108a-e may be planned for drilling into the strata 105. In an example in which a drilling operation forms at least one well at one or more of the potential well sites 108, the formed well may be used to access a subterranean reservoir 101 from the surface region 103 to produce hydrocarbons from the subterranean reservoir 101.

A computing device 104 can be positioned at the surface 103 of the subterranean formation 100 or elsewhere (e.g., offsite). The computing device 104 may be in communication with sensors or other electronic devices used for well planning and exploration. For example, the computing device 104 can include a communication interface, or be communicatively coupled to a communications device, for transmitting information to and receiving information from another communication interface of an exploration subsystem. The information may include seismic data about the subterranean formation 100 such as porosity or permeability of the subterranean reservoir 101 in the subterranean formation 100. The seismic data may be used by the computing device 104 to determine a composite seismic parameter to be used in machine-learning techniques.

Although one computing device 104 is depicted in FIG. 1, in other examples, more than one computing device can be used, and, together, the multiple computing devices can perform operations such as those described in the present disclosure. The computing device 104 is depicted in FIG. 1 as being positioned at the surface 103, but, in other examples, the computing device 104 can be positioned belowground, aboveground, onsite, in a vehicle, offsite, etc.

In some examples, the computing device 104 can include a communication device. The communication device can represent one or more of any components that facilitate a network connection. For example, the communications device can allow the computing device 104 to interface with other devices via a wired connection. But, in other examples, the communication device can allow the computing device 104 to interface with other devices wirelessly and can include wireless interfaces such as IEEE 802.11, Bluetooth™, or radio interfaces for accessing cellular telephone networks (e.g., transceiver/antenna for accessing a CDMA, GSM, UMTS, or other mobile communications network). In some examples, the communication device can use acoustic waves, surface waves, vibrations, optical waves, or induction (e.g., magnetic induction) for engaging in wireless communications. In an example in which the communication device is wired, the communications device can include interfaces such as Ethernet, USB, IEEE 1394, or a fiber optic interface. In an example with at least one other computing device, the computing device 104 can receive wired or wireless communications from the other computing device and perform one or more tasks based on the communications.

The computing device 104 may determine a composite seismic parameter for use in determining the future well sites 108. The computing device 104 may apply trained machine-learning models to seismic attributes determined from seismic data relating to the subterranean formation to generate a composite seismic parameter. In some examples, the computing device 104 may transmit the seismic attributes to an offsite facility (not shown) for determining the composite seismic parameter. In this example, the offsite facility may transmit the determined composite seismic parameter to the computing device 104. In response to determining or receiving the composite seismic parameter, the computing device 104 may determine and output the potential well sites 108. The potential well sites 108 may be displayed by the computing device 104 for viewing by an operator, or a supervisor, of the operation. The potential well sites 108 may be used to determine whether to form a hydrocarbon well in the subterranean formation 100 or for performing other tasks related to exploration, drilling, or hydrocarbon production of the subterranean formation 100.

Figure 2:
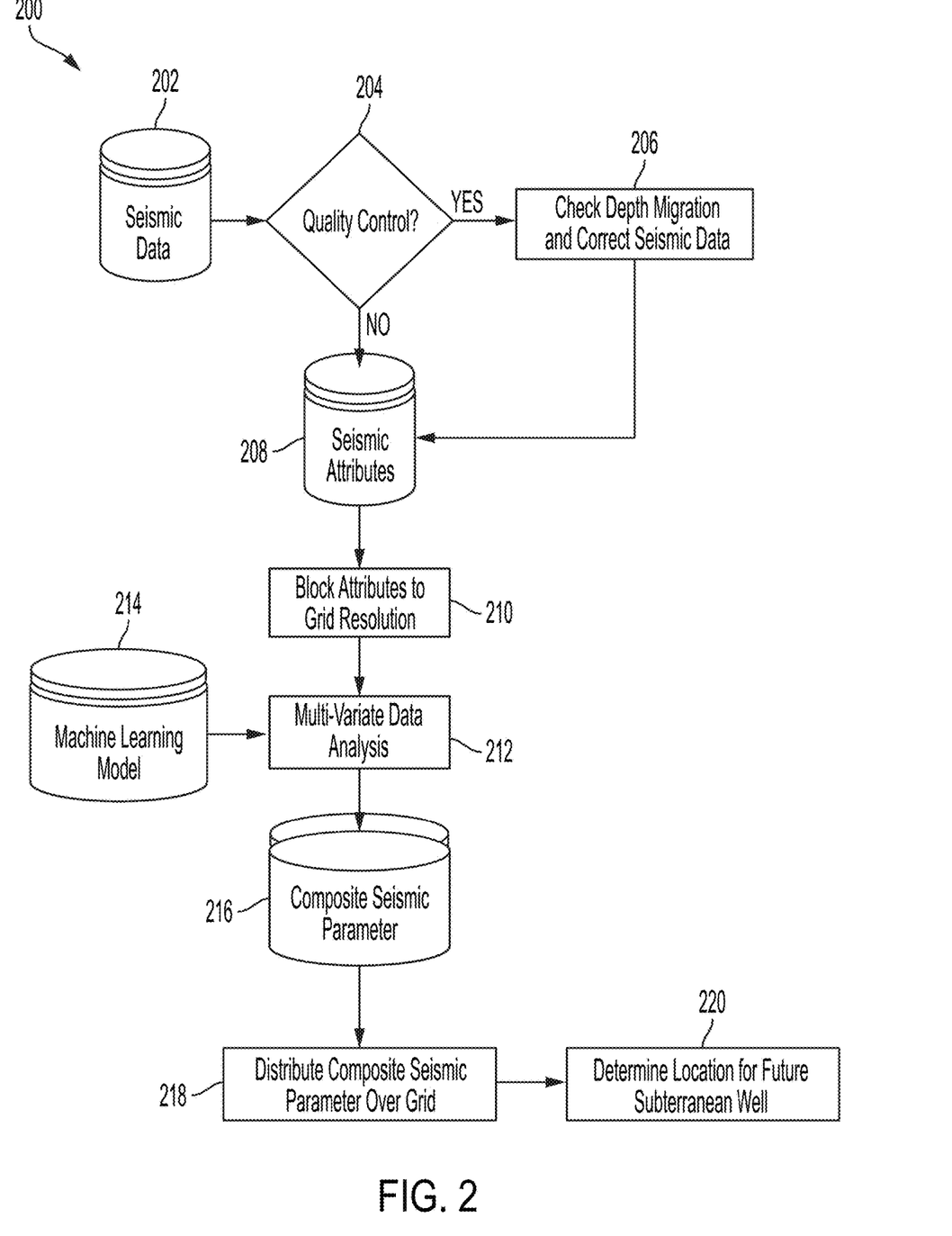
FIG. 2 is a diagram of a workflow for determining a location for a future well in a subterranean formation using machine-learning techniques according to one example of the present disclosure.

FIG. 2 is a diagram of a work flow 200 for determining a location of a potential future well site 108 in a subterranean formation 100 using machine-learning techniques according to one example of the present disclosure. The computing device 104 may receive seismic data 202 relating to the subterranean formation 100. The seismic data 202 may include raw, unprocessed data relating to the subterranean formation 100, such as indications of permeability, indications of porosity, lithology, and the like. The computing device 104 may determine whether to perform quality control operations on the seismic data 202 at block 204. In some examples, the computing device 104 may perform quality control operations when there is an indication that the quality of the seismic data 202 is compromised. If the computing device 104 determines that quality control is to be performed on the seismic data 202, the computing device 104 may perform a quality check that may include checking for depth migration and may include correcting the seismic data 202 at block 206. If the computing device 104 determines to not perform quality control on the seismic data 202, then the computing device 104 may bypass the block 204.

The computing device 104 may use the seismic data 202, the cleaned seismic data 202, or the subset of the seismic data 202 for extracting or otherwise determining seismic attributes 208. In some examples, the seismic attributes 208 may include seismic data 202 that is relevant to determining whether to recommend forming a hydrocarbon well in the subterranean formation 100. In some examples, the seismic attributes 208 may include acoustic impedance, formation sweetness, and phase, dip, and azimuth that may indicate an orientation of the subterranean formation 100. The seismic attributes 208 may be subsequently used in machine-learning techniques to determine a composite seismic parameter. The computing device 104 may block the seismic attributes 208 to a grid resolution at block 210. The computing device 104 may generate or otherwise receive a geo-cellular grid representative of the subterranean formation 100. The geo-cellular grid may include a set of cells that, when combined, provide a three-dimensional representation of the subterranean formation 100. The computing device 104 may distribute the seismic attributes 208 among the cells of the geo-cellular grid at the block 210 for subsequent use.

At block 212, the computing device 104 may perform multi-variate analysis using at least one trained machine-learning model 214. The at least one machine-learning model 214 may include a trained, semi-supervised classification algorithm, a trained, supervised classification algorithm, a combination thereof, or other suitable trained machine-learning models. Using the trained machine-learning model 214, the computing device may perform the multi-variate analysis at the block 212 to determine a composite seismic parameter 216.

The composite seismic parameter 216 may include a subset or a combination of the seismic attributes 208 distributed among the cells of the geo-cellular grid. In some examples, the composite seismic parameter 216 may be a location-dependent parameter that represents the subterranean formation 100. In other examples, the composite seismic parameter 216 may include a resolution that is the same as a resolution for the geo-cellular grid. In these examples, each cell of the geo-cellular grid may include a different representation of the composite seismic parameter 216. At block 218, the computing device 104 may distribute the composite seismic parameter 216 among the cells of the geo-cellular grid representative of the subterranean formation 100. For example, each geo-cellular grid cell may receive an indication of the composite seismic parameter 216 specific to the individual cell. Distributing the composite seismic parameter 216 at the block 218 may allow the computing device 104 to determine at least one location for a potential well site 108. In some examples, the composite seismic parameter 216 may characterize formations in the subterranean formation 100 at different locations such that the computing device may determine whether forming a hydrocarbon well at one or more of the locations is viable, economical, or otherwise desirable. And, at block 220, the computing device 104 may use the distributed composite seismic parameter 216 to determine and output a location for the potential future well site 108. In some examples, more than one location may be determined and output.

Figure 3:
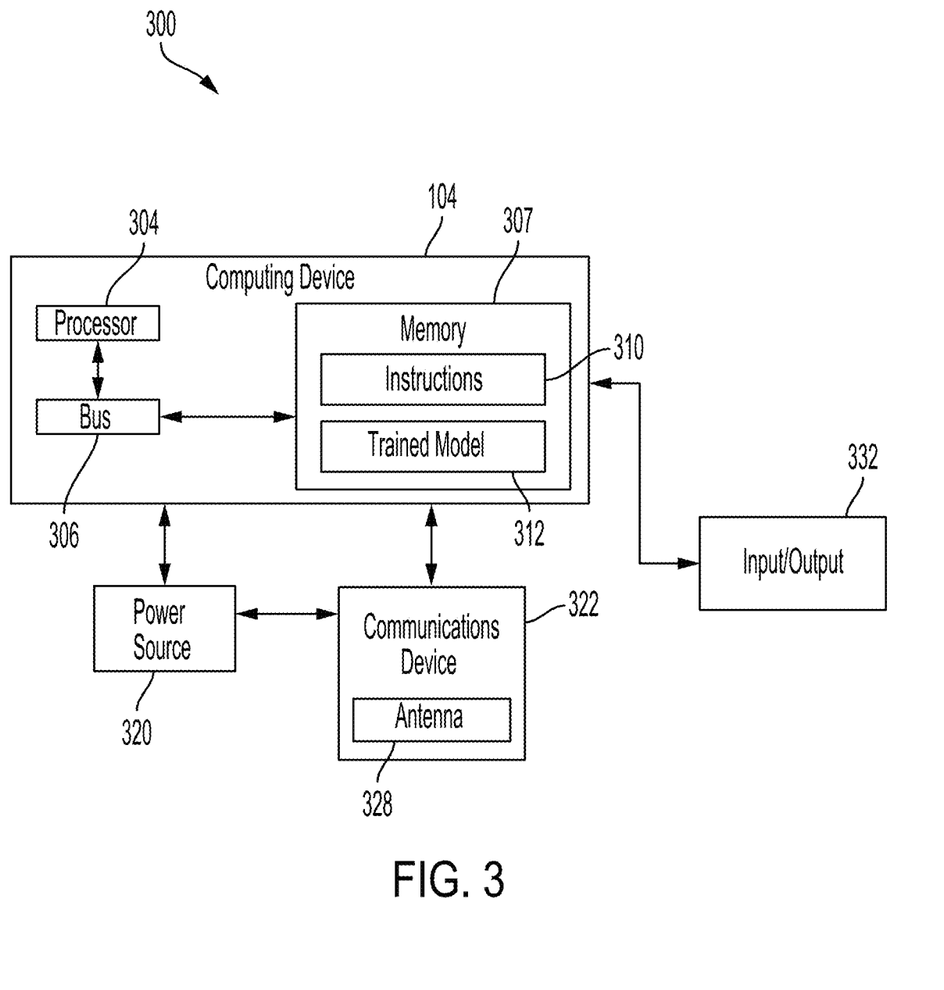
FIG. 3 is a block diagram of a computing system for determining a location for a future well in a subterranean formation using the machine-learning techniques according to one example of the present disclosure.

FIG. 3 is a block diagram of a computing system 300 for determining a location for a future well in a subterranean formation 100 using machine-learning techniques according to one example of the present disclosure. The components shown in FIG. 3, such as the computing device 104, power source 320, communications device 322, etc., can be integrated into a single structure. For example, the components can be within a single housing. In other examples, the components shown in FIG. 3 can be distributed via separate housings or otherwise and in electrical communication with each other.

The system 300 may include the computing device 104. The computing device 104 can include a processor 304 interfaced with other hardware via a bus 306. A memory 307, which can include any suitable tangible (and non-transitory) computer-readable medium, such as random-access memory ("RAM"), read-only memory ("ROM"), electrically erasable and programmable read-only memory ("EEPROM"), or the like, can embody program components that configure operation of the computing device 104. In some aspects, the computing device 104 can include input/output interface components (e.g., a display, printer, keyboard, touch-sensitive surface, and mouse) and additional storage.

The memory can include instructions 310, and the processor 304 can execute one or more operations included in the instructions 310 for determining future well locations in the subterranean formation 100 using machine-learning techniques. For example, the processor 304 can determine a composite seismic parameter by executing trained models 312 on data about the subterranean formation 100. The data can include suitable seismic data for determining the composite seismic parameter. The trained models 312 may be included in the memory 307 and may include a semi-supervised classification algorithm, a supervised classification algorithm, or other suitable trained machine-learning models for determining the future well locations. The instructions 310 may include other suitable instructions for determining future well locations in the subterranean formation. The processor 304 can execute instructions stored in the memory 307 to perform the operations. The processor 304 can include one processing device or multiple processing devices or cores. Non-limiting examples of the processor 304 include a Field-Programmable Gate Array ("FPGA"), an application-specific integrated circuit ("ASIC"), a microprocessor, etc.

The processor 304 can be communicatively coupled to the memory 307 via the bus 306. The memory 307 may be non-volatile and may include any type of memory device that retains stored information when powered off. Non-limiting examples of the memory 307 include EEPROM, flash memory, or any other type of non-volatile memory. In some examples, at least part of the memory 307 can include a medium from which the processor 304 can read instructions. A computer-readable medium can include electronic, optical, magnetic, or other storage devices capable of providing the processor 304 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The computing system 300 can include a power source 320. The power source 320 can be in electrical communication with the computing device 104 that may include a communications device 322. In some examples, the power source 320 can include a battery or an electrical cable (e.g., a wireline). The power source 320 can include an AC signal generator. The computing device 104 can operate the power source 320 to apply a transmission signal to an antenna 328, in an example in which the communications device 322 is operating in a wireless mode, to forward data relating to the subterranean formation 100, etc. to other systems. For example, the computing device 104 can cause the power source 320 to apply a voltage with a frequency within a specific frequency range to the antenna 328. This can cause the antenna 328 to generate a wireless transmission. In other examples, the computing device 104, rather than the power source 320, can apply the transmission signal to the antenna 328 for generating the wireless transmission.

In some examples, part of the communications device 322 can be implemented in software. For example, the communications device 322 can include additional instructions stored in memory 307 for controlling functions of the communications device 322. The communications device 322 can receive signals from remote devices and transmit data to remote devices. For example, the communications device 322 can transmit wireless communications that are modulated by data via the antenna 328. In some examples, the communications device 322 can receive signals (e.g. associated with data to be transmitted) from the processor 304 and amplify, filter, modulate, frequency shift, or otherwise manipulate the signals. In some examples, the communications device 322 can transmit the manipulated signals to the antenna 328. The antenna 328 can receive the manipulated signals and responsively generate wireless communications that carry the data.

The computing system 300 can include an input/output interface 332. The input/output interface 332 can connect to a keyboard, pointing device, display, and other computer input/output devices. An operator may provide input using the input/output interface 332. Additionally or alternatively, the operator may view outputs from the computing device 104 on the input/output interface 332. The determined locations of future well sites in the subterranean formation 100 may be displayed to the operator on the input/output interface 332. The displayed locations can provide an advisory function to the operator, or to the supervisor, of an operation using the computing system 300, either of whom can make adjustments or recommendations based on the displayed locations. In one example, in response to viewing the determined locations, the operator or supervisor may recommend or not recommend drilling a hydrocarbon well into the subterranean formation 100 for extracting produced hydrocarbon based on the determined locations.

Figure 4:
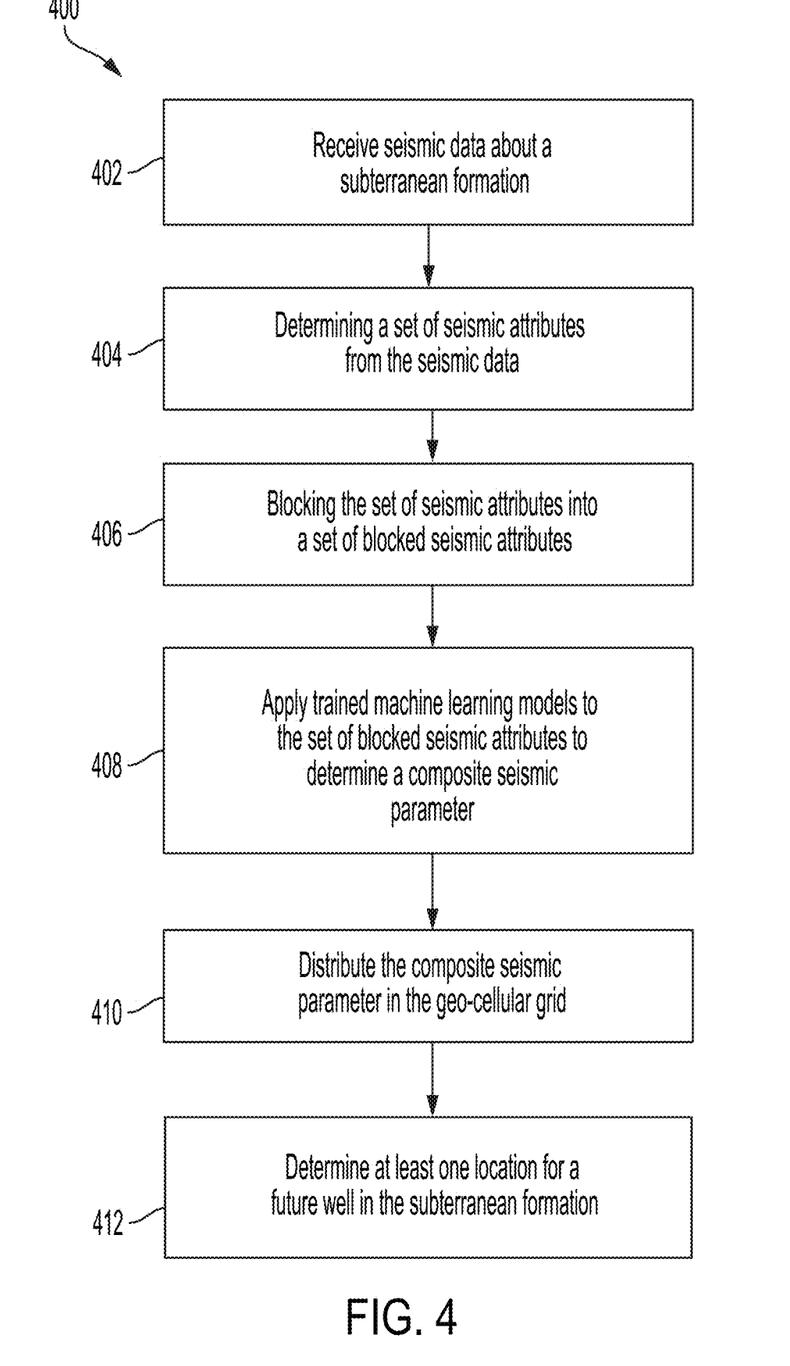
FIG. 4 is a flowchart of a process for determining a location for a future well in a subterranean formation using the machine-learning techniques according to one example of the present disclosure.

FIG. 4 is a flowchart of a process 400 for determining a location for a future well in a subterranean formation 100 using machine-learning techniques according to one example of the present disclosure. At block 402, the process 400 involves receiving seismic data about the subterranean formation 100. The seismic data may be similar or identical to the seismic data 202 of the work flow 200 and may include indications of permeability, indications of porosity, lithology, and other suitable seismic data about the subterranean formation 100. In some examples, the received seismic data may be unprocessed or pre-processed. For example, the computing device 104 may process or clean the received seismic data before performing the operations described herein.

At block 404, the process 400 involves determining a set of seismic attributes for the subterranean formation 100. The seismic attributes may include acoustic impedance, formation sweetness, and phase, dip, and azimuth that may indicate an orientation of the subterranean formation 100. The computing device 104 may determine the set of seismic attributes from the seismic data received at the block 402, and the determined set of seismic attributes may be similar or identical to the seismic attributes 208 of the work flow 200. In some examples, the set of seismic attributes may include the processed, received seismic data. In other examples, the computing device 104 may generate a subset of the received seismic data by filtering undesirable or non-valuable data from the received seismic data to determine the set of seismic attributes.

At block 406, the process 400 involves blocking the set of seismic attributes into a blocked set of seismic attributes. The blocked set of seismic attributes may include the set of seismic attributes distributed among cells of a geo-cellular grid representative of the subterranean formation 100. In some examples, the geo-cellular grid may divide the subterranean formation 100 into easy-to-process cells for the computing device 104, and each cell of the geo-cellular grid may include a subset of the blocked set of seismic attributes. For example, each cell may be assigned a representation of each of the seismic attributes determined at block 404.

At block 408, the process 400 involves applying trained machine-learning models to the blocked set of seismic attributes to determine a composite seismic parameter 216. The trained machine-learning models may be similar or identical to the at least one trained machine-learning model 214 of the work flow 200 and may include a trained, semi-supervised classification algorithm, a trained, supervised classification algorithm, or other suitable trained machine-learning models. The composite seismic parameter may include a subset or a combination of the blocked set of seismic attributes. In some examples, the composite seismic parameter may be a location-dependent parameter that represents the seismic data of the subterranean formation 100. In other examples, the composite seismic parameter may be generated for a subset of the seismic attributes. In these examples, the composite seismic parameter may include a resolution that is the same as a resolution for the geo-cellular grid and each cell of the geo-cellular grid may include a different representation of the composite seismic parameter 216.

At block 410, the process 400 involves distributing the composite seismic parameter among the cells of the geo-cellular grid. The distribution may involve interpolating the composite seismic parameter 216 to each cell included in the geo-cellular grid. In some examples, the computing device 104 may perform the distribution using a 3D reservoir static modeling solution software, and the software may be configured to model the subterranean formation 100 in 2D and 3D. In some examples, distributing the composite seismic parameter 216 may characterize formation locations based on a predicted hydrocarbon presence.

At block 412, the process 400 involves determining a location of a potential future well site 108 in the subterranean formation 100. The computing device 104 may determine the location by using the composite seismic parameter 216 determined at the block 410. In some examples, the computing device 104 may determine more or less than one location for the potential future well site 108. In other examples, the determination may additionally include a recommended trajectory at which to form a hydrocarbon well at the potential future well site 108. The computing device 104 may output the determined location for the potential future well site 108 for viewing by a user of the computing device 104.

Figure 5:
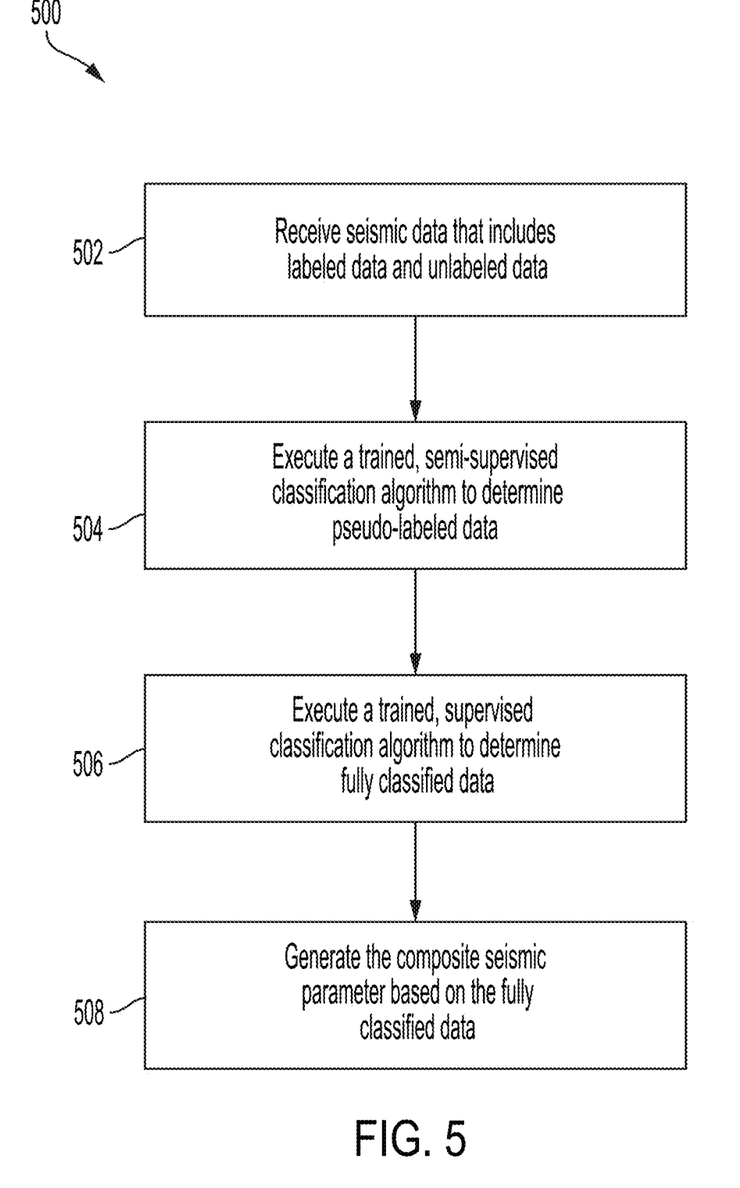
FIG. 5 is a flowchart of a process for determining a composite seismic parameter for use in determining a location for a future well in a subterranean formation according to one example of the present disclosure.

FIG. 5 is a flowchart of a process 500 for determining a composite seismic parameter for use in determining a location of a future well in a subterranean formation 100 according to one example of the present disclosure. In some examples, the process 500 may be similar or identical to the operations performed by the computing device 104 at the block 408 of the process 400. At block 502, the process 500 involves receiving seismic data about the subterranean formation 100 that includes labeled and unlabeled data. The received seismic data may be similar or identical to the seismic data 202 of the work flow 200 and may include indications of permeability, indications of porosity, lithology, and other suitable seismic data about the subterranean formation 100. In some examples, the received seismic data may be unprocessed or pre-processed.

At block 504, the process 500 involves executing a trained, semi-supervised classification algorithm to determine pseudo-labeled data. The computing device 104 may apply the trained, semi-supervised classification algorithm to the seismic data received at the block 502. In some examples, the computing device 104 may apply the trained, semi-supervised classification algorithm to the labeled data and to the unlabeled data of the seismic data 202 to determine the pseudo-labeled data. The labeled data may include a label for a portion of the seismic data 202 that is generated based on information obtained from exploration wells. The information may include core samples or other suitable, reliable data sources, and the labels may be an indication of portions of the subterranean formation that are likely or unlikely to include hydrocarbons. The unlabeled data may include seismic data for portions of the subterranean formation that are not associated with the exploration wells or other suitable, reliable data sources.

The pseudo-labeled data, which is generated by applying the semi-supervised classification algorithm to the labeled data and the unlabeled data, may include labels based on the similarities between the seismic data of the labeled data and the seismic data of the unlabeled data. In some examples, the labeled data and the pseudo-labeled data may include indications of whether hydrocarbons exist at particular locations in the subterranean formation 100. In these examples, the labeled data may be highly reliable, while the pseudo-labeled data may include less reliability than the labeled data.

At block 506, the process 500 involves executing a trained, supervised classification algorithm to determine fully classified data. The computing device 104 may apply the trained, supervised classification algorithm to the pseudo-labeled data and to the labeled data to determine the fully classified data. The fully classified data may include a subset of a combination of the labeled data and the unlabeled data. And, in some examples, unlike the unlabeled data, the fully classified data may be usable in determining the location of the potential future well site 108.

At block 508, the process 500 involves generating the composite seismic parameter 216 using the fully classified data. The computing device 104 may receive the fully classified data determined at the block 506. The computing device 104 may use the received fully classified data to generate the composite seismic parameter 216. The composite seismic parameter 216 may be used by the computing device 104 to determine the location of the potential future well site 108 in the subterranean formation 100.

Figure 6:
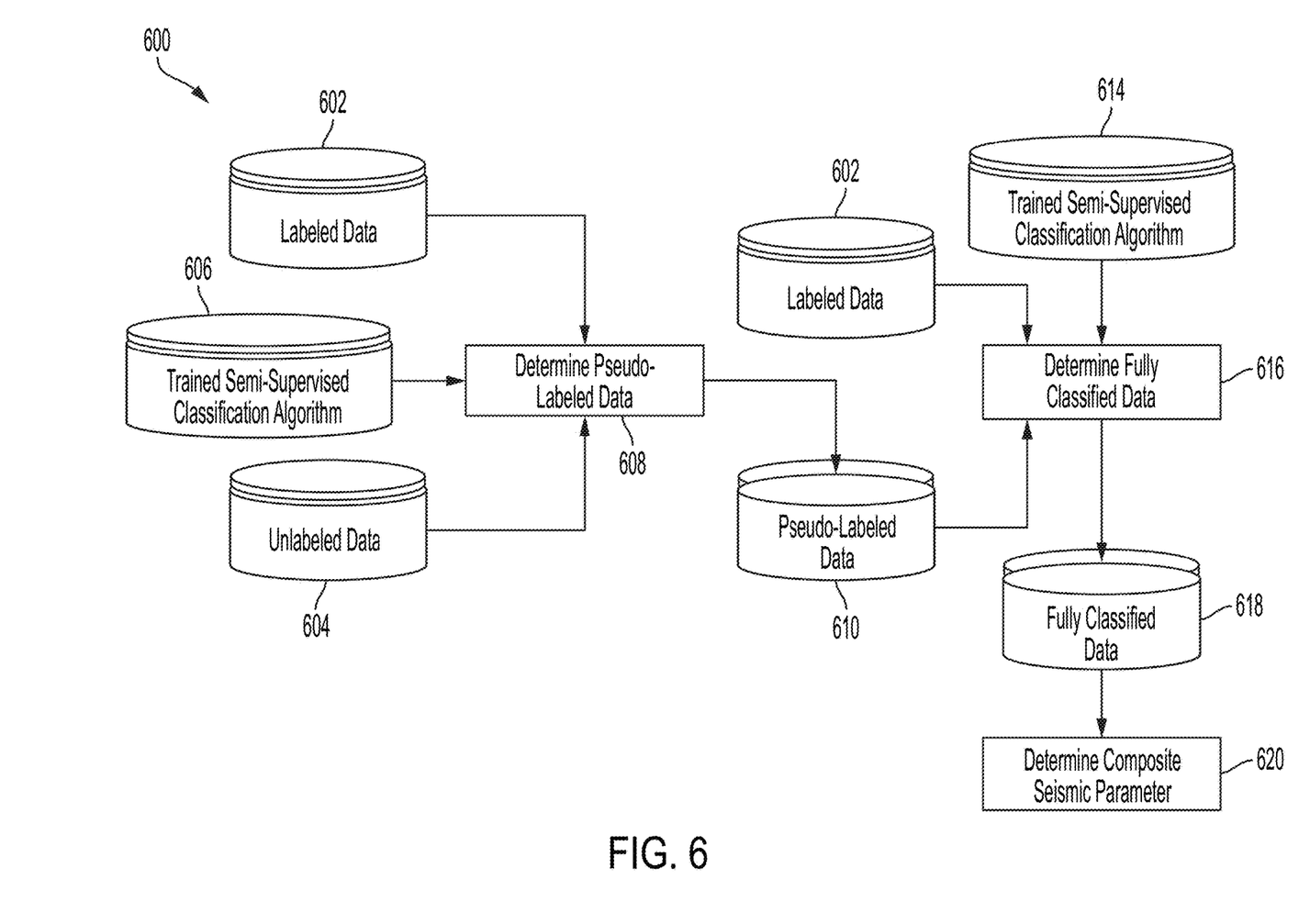
FIG. 6 is a diagram of a workflow for determining a composite seismic parameter for use in determining a location for a future well in a subterranean formation according to one example of the present disclosure.

FIG. 6 is a diagram of a workflow 600 for determining a composite seismic parameter 216 for use in determining a location of a potential future well site 108 in a subterranean formation 100 according to one example of the present disclosure. The computing device 104 may receive seismic data, as described at the block 502 of the process 500, which includes labeled data 602 and unlabeled data 604.

The labeled data 602 and the unlabeled data 604 may be data representing the subterranean formation 100. The labeled data may include a label for a portion of the seismic data 202 that is generated based on information obtained from exploration wells. The information may include core samples or other suitable, reliable data sources, and the labels may be an indication of portions of the subterranean formation that are likely or unlikely to include hydrocarbons. The unlabeled data may include seismic data for portions of the subterranean formation that are not associated with the exploration wells or other suitable, reliable data sources.

The computing device 104 may include or otherwise access a trained, semi-supervised classification algorithm 606. The trained, semi-supervised classification algorithm 606 may be trained to take labeled data and unlabeled data as inputs and output pseudo-labeled data. At block 608, the computing device 104 may apply the trained, semi-supervised classification algorithm 606 to the labeled data 602 and to the unlabeled data 604 to determine the pseudo-labeled data 610. The pseudo-labeled data 610 may include labels based on the similarities between the seismic data of the labeled data 602 and the seismic data of the unlabeled data 604. In some examples, the labeled data 602 and the pseudo-labeled 610 data may include indications of whether hydrocarbons exist at particular locations in the subterranean formation 100. In these examples, the labeled data 602 may be highly reliable, while the pseudo-labeled data 610 may include less reliability than the labeled data 602.

The computing device 104 may receive or otherwise access the pseudo-labeled data 610 and the labeled data 602 for use in machine-learning techniques. The computing device 104 may additionally include a trained, supervised classification algorithm 614. The trained, supervised classification algorithm 614 may be applied to the labeled data 602 and the pseudo-labeled data 610 as inputs and output fully classified data 618 at block 616. In some examples, the fully classified data 618 may include labels for the entirety of the seismic data. That is, the fully classified data 618 may include labels for the labeled data 602 and the unlabeled data 604. The fully classified data 618 may be used by the computing device 104 to determine the composite seismic parameter 216 at block 620.

In some examples, the computing device 104 may block the fully classified data 618 to a geo-cellular grid representative of the subterranean formation 100. Once blocked to the geo-cellular grid, the fully classified data 618 may be used as the composite seismic parameter 216 that characterizes the subterranean formation to determine at least one location for a potential future well site 108.

Figure 7:
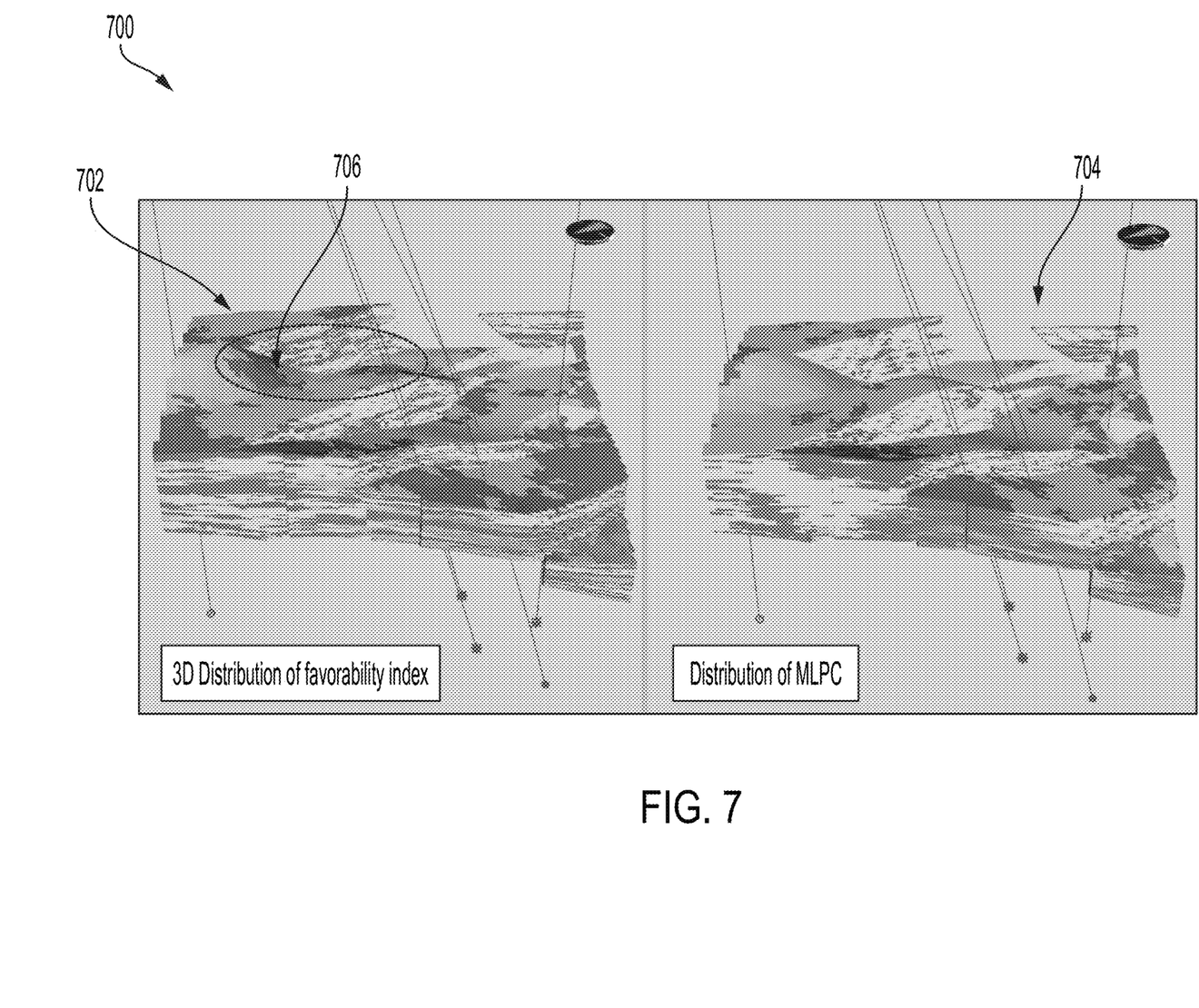
FIG. 7 is an example of a geo-cellular grid, which includes a distributed composite seismic parameter, representative of a subterranean formation according to one example of the present disclosure.

FIG. 7 is an example of a geo-cellular grid 700, which includes a distributed composite seismic parameter 216, of a subterranean formation 100 according to one example of the present disclosure. As illustrated, the geo-cellular grid 700 includes a distribution 702 of a favorability index and a distribution 704 of the distributed composite seismic parameter 216. The favorability index may be generated or accessed by the computing device 104 without using the machine-learning techniques described above. The composite seismic parameter 216, which may be generated using the machine-learning techniques described above, may be distributed among the geo-cellular grid representative of the subterranean formation 100 for characterizing formation locations based on the predicted presence of hydrocarbons. The distributions 702 and 704 may include lightly shaded regions and darker shaded regions. The darker shaded regions may indicate that the regions are more likely to include favorable conditions for producing hydrocarbons. The lighter the shading in the regions may indicate that the regions are less likely to include favorable conditions for producing hydrocarbons. The future well sites 108 may be determined based on the darkness of the shading of the regions. The geo-cellular grid 700 includes a circled region 706. As illustrated, the circled region 706 shows more darker regions in the distribution 702 than in the distribution 704. In other words, the distribution 702 may inaccurately depict portions of the geo-cellular grid 700 that include favorable conditions for producing hydrocarbons. This may indicate that the distribution 704 of the distributed composite seismic parameter may be more accurate than the distribution 702 of the favorability index.

In some aspects, systems, methods, and non-transitory computer-readable mediums for determining a location of a future well in a subterranean formation using machine learning are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: a processor; and a non-transitory computer-readable medium comprising instructions that are executable by the processor to cause the processor to perform operations comprising: receiving seismic data about a subterranean formation; determining a set of seismic attributes from the seismic data; blocking the set of seismic attributes into a set of blocked seismic attributes by distributing the set of seismic attributes into a geo-cellular grid representative of the subterranean formation; applying a trained machine-learning model to the set of blocked seismic attributes to generate a composite seismic parameter; and distributing the composite seismic parameter into the geo-cellular grid representative of the subterranean formation to characterize formation locations based on a predicted presence of hydrocarbons.

Example 2 is the system of example 1, wherein the non-transitory computer-readable medium further comprises instructions that are executable by the processor to cause the processor to perform operations comprising: determining, using the distributed composite seismic parameter, at least one location of a future well in the subterranean formation.

Example 3 is the system of any of examples 1-2, wherein the operation of applying the trained machine-learning model to the set of blocked seismic attributes includes: receiving the seismic data that includes labeled data and unlabeled data; applying a trained, semi-supervised classification algorithm to the labeled data and the unlabeled data to determine pseudo-labeled data; applying a trained, supervised classification algorithm to the labeled data and the pseudo-labeled data to determine fully classified data of the seismic data; and generating, based on the fully classified data, the composite seismic parameter.

Example 4 is the system of any of examples 1-3, wherein the set of seismic attributes comprises acoustic impedance, formation sweetness, and phase, dip, and azimuth of the subterranean formation.

Example 5 is the system of any of examples 1-4, wherein the distributed composite seismic parameter comprises a representation of the predicted presence of hydrocarbons in each cell of the geo-cellular grid representative of the subterranean formation.

Example 6 is the system of any of examples 1-5, wherein the geo-cellular grid comprises a plurality of cells forming a three-dimensional grid of the subterranean formation.

Example 7 is the system of any of examples 1-6, wherein the composite seismic parameter comprises a combined representation of the set of blocked seismic attributes for each location in the subterranean formation.

Example 8 is a method comprising: determining a set of attributes from a set of data; blocking the set of attributes into a set of blocked attributes by distributing the set of attributes onto a grid associated with set of data; and applying a trained machine-learning model to the set of blocked attributes to generate a composite parameter of the set of attributes.

Example 9 is the method of example 8, further comprising: distributing the composite parameter in the grid to characterize locations represented by the set of data based on a predicted presence of hydrocarbons; and determining, using the distributed composite parameter, at least one location for a future well in a subterranean formation represented by the set of data.

Example 10 is the method of any of examples 8-9, wherein applying the trained machine-learning model to the set of blocked attributes to generate the composite parameter comprises: receiving the set of data that includes labeled data and unlabeled data; applying a trained, semi-supervised classification algorithm to the labeled data and the unlabeled data to determine pseudo-labeled data; applying a trained, supervised classification algorithm to the labeled data and the pseudo-labeled data to determine fully classified data of the set of data; and generating, based on the fully classified data, the composite parameter.

Example 11 is the method of any of examples 8-10, wherein the set of attributes comprises acoustic impedance, formation sweetness, and phase, dip, and azimuth of a subterranean formation associated with the set of data.

Example 12 is the method of any of examples 8-11, wherein the composite parameter comprises a representation of a predicted presence of hydrocarbons in each cell of the grid associated with the set of data.

Example 13 is the method of any of examples 8-12, wherein the grid includes a plurality of cells forming a three-dimensional grid of a subterranean formation associated with the set of data.

Example 14 is the method of any of examples 8-13, wherein the composite parameter comprises a combined representation of the set of blocked attributes for each cell location of the grid associated with the set of data.

Example 15 is a non-transitory computer-readable medium comprising instructions that are executable by a processing device for causing the processing device to perform operations comprising: receiving seismic data about a subterranean formation; determining a set of seismic attributes from the seismic data; blocking the set of seismic attributes into a set of blocked seismic attributes by distributing the set of seismic attributes onto a geo-cellular grid representative of the subterranean formation; applying a trained machine-learning model to the set of blocked seismic attributes to generate a composite seismic parameter; distributing the composite seismic parameter into the geo-cellular grid representative of the subterranean formation to characterize formation locations based on a predicted presence of hydrocarbons; and determining, using the distributed composite seismic parameter, at least one location of a future well in the subterranean formation.

Example 16 is the non-transitory computer-readable medium of example 15, wherein the operation of applying the trained machine-learning model to the set of blocked seismic attributes includes: receiving the seismic data that includes labeled data and unlabeled data; applying a trained, semi-supervised classification algorithm to the labeled data and the unlabeled data to determine pseudo-labeled data; applying a trained, supervised classification algorithm to the labeled data and the pseudo-labeled data to determine fully classified data of the seismic data; and generating, based on the fully classified data, the composite seismic parameter.

Example 17 is the non-transitory computer-readable medium of any of examples 15-16, wherein the set of seismic attributes comprises acoustic impedance, formation sweetness, and phase, dip, and azimuth of the subterranean formation.

Example 18 is the non-transitory computer-readable medium of any of examples 15-17, wherein the distributed composite seismic parameter comprises a representation of the predicted presence of hydrocarbons in each cell of the geo-cellular grid representative of the subterranean formation.

Example 19 is the non-transitory computer-readable medium of any of examples 15-18, wherein the geo-cellular grid includes a plurality of cells forming a three-dimensional grid of the subterranean formation.

Example 20 is the non-transitory computer-readable medium of any of examples 15-19, wherein the composite seismic parameter comprises a combined representation of the set of blocked seismic attributes for each location in the subterranean formation.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processor; and
a non-transitory computer-readable medium comprising instructions that are executable by the processor to cause the processor to perform operations comprising:
  receiving seismic data about a subterranean formation;
  determining a set of seismic attributes from the seismic data;
  blocking the set of seismic attributes into a set of blocked seismic attributes by distributing the set of seismic attributes into a geo-cellular grid representative of the subterranean formation;
  applying a trained machine-learning model to the set of blocked seismic attributes to generate a composite seismic parameter based on fully classified data by:
    determining pseudo-labeled data using a semi-supervised classification algorithm; and
    determining the fully classified data by applying a supervised classification algorithm to at least the pseudo-labeled data; and
  distributing the composite seismic parameter into the geo-cellular grid representative of the subterranean formation to characterize formation locations based on a predicted presence of hydrocarbons.

2. The system of claim 1, wherein the non-transitory computer-readable medium further comprises instructions that are executable by the processor to cause the processor to perform operations comprising:
determining, using the distributed composite seismic parameter, at least one location of a future well in the subterranean formation.

3. The system of claim 1, wherein the operation of applying the trained machine-learning model to the set of blocked seismic attributes includes:
receiving the seismic data that includes labeled data and unlabeled data;
applying a trained, semi-supervised classification algorithm to the labeled data and the unlabeled data to determine the pseudo-labeled data;
applying a trained, supervised classification algorithm to the labeled data and the pseudo-labeled data to determine the fully classified data of the seismic data; and
generating, based on the fully classified data, the composite seismic parameter.

4. The system of claim 1, wherein the set of seismic attributes comprises acoustic impedance, formation sweetness, and phase, dip, and azimuth of the subterranean formation.

5. The system of claim 1, wherein the distributed composite seismic parameter comprises a representation of the predicted presence of hydrocarbons in each cell of the geo-cellular grid representative of the subterranean formation.

6. The system of claim 1, wherein the geo-cellular grid comprises a plurality of cells forming a three-dimensional grid of the subterranean formation.

7. The system of claim 1, wherein the composite seismic parameter comprises a combined representation of the set of blocked seismic attributes for each location in the subterranean formation.

8. A method comprising:
determining a set of attributes from a set of data associated with a subterranean formation;
blocking the set of attributes into a set of blocked attributes by distributing the set of attributes onto a grid associated with the set of data;
applying a trained machine-learning model to the set of blocked attributes to generate a composite parameter of the set of attributes based on fully classified data by:
  determining pseudo-labeled data using a semi-supervised classification algorithm; and
  determining the fully classified data by applying a supervised classification algorithm to at least the pseudo-labeled data; and
determining, using the composite parameter, at least one location of a future well in the subterranean formation.

9. The method of claim 8, further comprising:
distributing the composite parameter in the grid to characterize locations represented by the set of data based on a predicted presence of hydrocarbons.

10. The method of claim 8, wherein applying the trained machine-learning model to the set of blocked attributes to generate the composite parameter comprises:

receiving the set of data that includes labeled data and unlabeled data;

applying a trained, semi-supervised classification algorithm to the labeled data and the unlabeled data to determine the pseudo-labeled data;

applying a trained, supervised classification algorithm to the labeled data and the pseudo-labeled data to determine the fully classified data of the set of data; and generating, based on the fully classified data, the composite parameter.

11. The method of claim 8, wherein the set of attributes comprises acoustic impedance, formation sweetness, and phase, dip, and azimuth of a subterranean formation associated with the set of data.

12. The method of claim 8, wherein the composite parameter comprises a representation of a predicted presence of hydrocarbons in each cell of the grid associated with the set of data.

13. The method of claim 8, wherein the grid includes a plurality of cells forming a three-dimensional grid of a subterranean formation associated with the set of data.

14. The method of claim 8, wherein the composite parameter comprises a combined representation of the set of blocked attributes for each cell location of the grid associated with the set of data.

15. A non-transitory computer-readable medium comprising instructions that are executable by a processing device for causing the processing device to perform operations comprising:

receiving seismic data about a subterranean formation;

determining a set of seismic attributes from the seismic data;

blocking the set of seismic attributes into a set of blocked seismic attributes by distributing the set of seismic attributes onto a geo-cellular grid representative of the subterranean formation;

applying a trained machine-learning model to the set of blocked seismic attributes to generate a composite seismic parameter based on fully classified data by:

determining pseudo-labeled data using a semi-supervised classification algorithm; and determining the fully classified data by applying a supervised classification algorithm to at least the pseudo-labeled data;

distributing the composite seismic parameter into the geo-cellular grid representative of the subterranean formation to characterize formation locations based on a predicted presence of hydrocarbons; and determining, using the distributed composite seismic parameter, at least one location of a future well in the subterranean formation.

16. The non-transitory computer-readable medium of claim 15, wherein the operation of applying the trained machine-learning model to the set of blocked seismic attributes includes:

receiving the seismic data that includes labeled data and unlabeled data;

applying a trained, semi-supervised classification algorithm to the labeled data and the unlabeled data to determine the pseudo-labeled data;

applying a trained, supervised classification algorithm to the labeled data and the pseudo-labeled data to determine the fully classified data of the seismic data; and generating, based on the fully classified data, the composite seismic parameter.

17. The non-transitory computer-readable medium of claim 15, wherein the set of seismic attributes comprises acoustic impedance, formation sweetness, and phase, dip, and azimuth of the subterranean formation.

18. The non-transitory computer-readable medium of claim 15, wherein the distributed composite seismic parameter comprises a representation of the predicted presence of hydrocarbons in each cell of the geo-cellular grid representative of the subterranean formation.

19. The non-transitory computer-readable medium of claim 15, wherein the geo-cellular grid includes a plurality of cells forming a three-dimensional grid of the subterranean formation.

20. The non-transitory computer-readable medium of claim 15, wherein the composite seismic parameter comprises a combined representation of the set of blocked seismic attributes for each location in the subterranean formation.

* * * * *